(12) United States Patent
Kloiber et al.

(10) Patent No.: US 8,818,537 B2
(45) Date of Patent: Aug. 26, 2014

(54) SOFTWARE MONITOR AND CONTROL APPLICATION FOR USE WITH A DIGITAL AUDIO STUDIO SUITE

(75) Inventors: Martin Kloiber, Portola Valley, CA (US); Steven Hollister Milne, Palo Alto, CA (US); Timothy Mark Driedger, Mountain View, CA (US)

(73) Assignee: Avid Technology, Inc., Burlington, MA (US)

( * ) Notice: Subject to any disclaimer, the term of this patent is extended or adjusted under 35 U.S.C. 154(b) by 1059 days.

(21) Appl. No.: 11/245,772

(22) Filed: Oct. 6, 2005

(65) Prior Publication Data
US 2006/0072771 A1   Apr. 6, 2006

Related U.S. Application Data

(60) Provisional application No. 60/616,709, filed on Oct. 6, 2004.

(51) Int. Cl.
*G06F 17/00* (2006.01)
*H04H 60/04* (2008.01)
*G06F 3/16* (2006.01)

(52) U.S. Cl.
CPC . *G06F 3/16* (2013.01); *H04H 60/04* (2013.01)

USPC ............................................. 700/94

(58) Field of Classification Search
USPC ....... 700/94; 704/500; 369/4; 381/20–23, 61, 381/119
See application file for complete search history.

(56) References Cited

U.S. PATENT DOCUMENTS

| | | | |
|---|---|---|---|
| 5,913,038 A | 6/1999 | Griffiths | |
| 6,519,540 B1 * | 2/2003 | Salandro | 702/68 |
| 6,580,359 B1 * | 6/2003 | Tam | 340/14.1 |
| 7,242,990 B2 * | 7/2007 | Suyama et al. | 700/94 |
| 7,257,641 B1 * | 8/2007 | VanBuskirk et al. | 709/238 |
| 2002/0099458 A1 * | 7/2002 | Rudolph | 700/94 |

* cited by examiner

*Primary Examiner* — Andrew C Flanders
(74) *Attorney, Agent, or Firm* — Oliver Strimpel (57) ABSTRACT

A crosspoint matrix for digital signal routing and control, the matrix realized by software code includes a plurality of configurable inputs adapted to accept one or more input signals; a plurality of configurable outputs connected via signal paths to the inputs; and a plurality of variable gain control circuits described by code at each signal path intersection for enabling signal strength level adjustment. In a preferred embodiment, the matrix is a software interface inserted between a sound editing application and a sound card.

16 Claims, 8 Drawing Sheets

SOFTWARE MONITOR AND CONTROL APPLICATION FOR USE WITH A DIGITAL AUDIO STUDIO SUITE

CROSS-REFERENCE TO RELATED APPLICATIONS

The instant application hereby claims priority to provisional patent application Ser. No. 60/616,709 filed on Oct. 6, 2004. The entire disclosure of the prior application is included herein in its entirety at least by reference.

BACKGROUND OF THE INVENTION

1. Field of the Invention

The present invention is in the field of digital sound editing and mixing and pertains particularly to audio control and audio presentation components and methods used in digital mixing and sound editing operations. The present invention may also have application to audio/video editing, production, and mixing.

2. Discussion of the State of the Art

In the field of digital sound editing, much has been accomplished in the way of providing digital recording, mixing, and editing functions for sound studios operated by recording companies and the like. Today, there are a wide variety of sound recording and editing software packages that may run on anything from a single desktop computer to a network of specialized processors having video display units (VDUs) or physical control panels incorporating slider and mode button control indicia to enable interaction and control of various processes and tasks related to audio production in the studio.

One challenge in the art of monitoring pre-mixed or raw audio for post-recording mixing, editing and refining in a studio is the necessity of required hardware for monitoring and mixing the output from a digital studio application. While audio recording and general editing is possible using computer software from a station hosting a suitable soundcard, final mixing and high-definition sound editing and the like requires sophisticated hardware monitoring and mixing equipment sporting numerous physical audio inputs and outputs. The equipment typically includes some physical monitoring and control interface including recording components, mixing devices, re-mixing devices and the like. Moreover numerous control indicia including control room volume, master recorder volume, stem recorder volume, external inputs and other features are typical. Such devices are known to the inventor and may include the likes of Martinsound™ audio monitor and recording systems, as well as those produced by Makie™ and Sound Performance Lab™ (SPL).

The above systems are dedicated hardware solutions to audio production and may add expense to recording projects and may be difficult to learn how to use efficiently. Therefore, what is clearly needed in the art is a software monitoring and sound mixing solution that may replace any physical hardware system now in use.

SUMMARY OF THE INVENTION

A crosspoint matrix is provided for digital signal routing and control, the matrix is realized by software code and includes, a plurality of configurable inputs adapted to accept one or more input signals, a plurality of configurable outputs connected via signal paths to the inputs, and a plurality of variable gain control circuits described by code at each signal path intersection for enabling signal strength level adjustment. In a preferred embodiment, the one or more input signals stem from a digital sound editing application running on a host computer. In this embodiment, the outputs connect to virtual input ports on a sound card.

In one embodiment, the matrix includes matrices for routing signals to monitor, to record, and to control room. In one embodiment, the matrix further includes process block for applying digital signal formatting and signal processing to the routed signals.

According to another aspect of the present invention, an audio software interface connected to sound card hardware is provided. The interface is for routing and processing digital output from an audio editing application, and includes a crosspoint matrix for digital signal routing and control, the matrix realized by software code, and a graphics user interface for implementing and for configuring inputs and outputs of the matrix and for implementing control functions to the signals traveling the matrix.

In a preferred embodiment, the software interface is presented as a sound hardware interface to the audio editing application, the presentation described and managed via software. In one embodiment, the software interface is installed and executed from a computer hosting the editing application and the sound card hardware. Also in one embodiment, the hosting computer is connected to a local area network supporting other nodes providing audio input to the interface. Also in one embodiment, the hosting computer is connected to a local area network supporting other nodes providing digital signal processing of signals routed thereto through the interface and then returned to the interface as new inputs.

According to another aspect of the invention, a method for inserting a signal routing and control matrix as a software interface between a sound editing application and a sound card is provided. The method includes steps for (a) selecting one or more input types on the matrix and configuring those inputs for desired sound protocol; (b) connecting the inputs to at least one output of the sound editing application; (c) selecting one or more output types on the matrix and configuring those outputs for desired sound protocol; and (d) connecting those outputs to one or more inputs presented on the sound card.

In a preferred aspect, in step (a), the desired sound protocols are one of stereo, mono, 5.1 surround, 6.1 surround, 7.1 surround, or left center right surround (LCRS). In this aspect, in step (a), the input type is one of a signal buss, an external feed-in, a recording stem feed-in, a master recording feed-in, an insert return, or a production feed-in. In one aspect, in step (b), the connection is made through a graphics user interface screen using point and click computer selection method.

In a preferred aspect, in step (c), the output type includes one of a control room monitor feed, a monitor feed, a stem recorder feed, a master recorder feed, an insert send, or an alternate feed to another matrix. In one aspect, in step (d), the output is grouped as a bus signal and connected to the soundcard. Also in one aspect, in step (c), volume control is provided on a set of outputs. In all aspects, in steps (a) through (d), signal processing may optionally be provided on any configured input or output.

In one aspect a further step (e) is provided for controlling the matrix to achieve volume control and foldown, the control commands made through a graphics user interface using point and click computer selection method.

In yet another aspect of the invention, a system is provided for digital signal routing and control. The system includes a crosspoint matrix, the matrix realized by software code, a graphics user interface for implementing and for configuring inputs and outputs of the matrix and for implementing control functions to the signals traveling the matrix, and a control interface for application of digital signal processes and signal strength.

In one embodiment, the control interface is a software application hosted in a same node or in a node connected to the node hosting the crosspoint matrix. In another embodiment, the control interface is a hardware control surface having network or peripheral access to the node hosting the crosspoint matrix.

DETAILED DESCRIPTION

Figure 1:
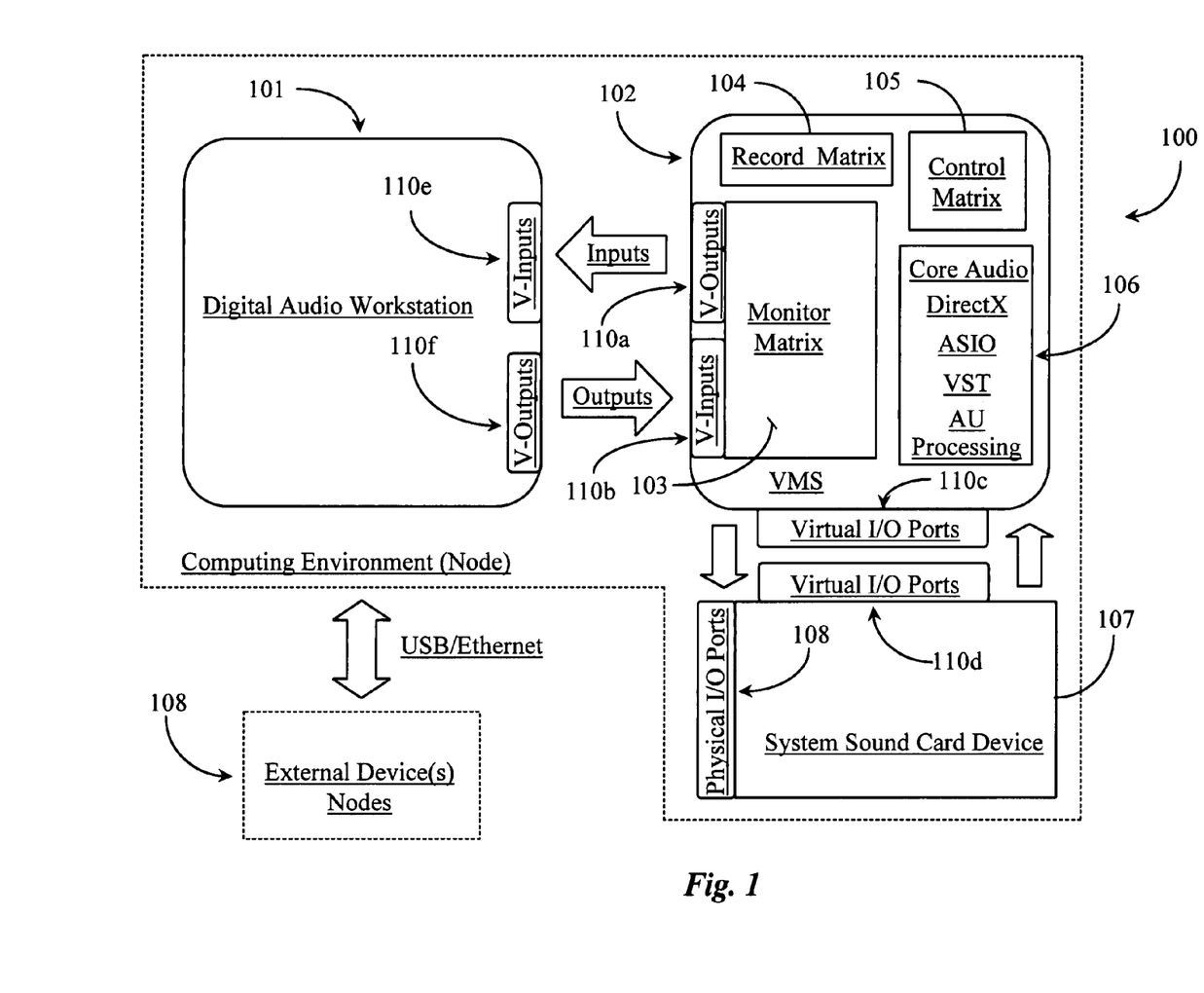
FIG. 1 is a block diagram illustrating software component integration of digital studio editing software and virtual monitoring and control software on a computing node according to an embodiment of the present invention.

FIG. 1 is a block diagram illustrating software component integration of digital studio editing software 101 and virtual monitoring and control software 102 on a computing node 100 according to an embodiment of the present invention. Computing node 100 may be a desktop computer, a server with a graphic user interface, a laptop computer, or any other computing device having suitable memory and processing power for performance of digital studio editing of digital audio and, in some cases video.

Computing node 100 may be referred to herein after as computer 100. A digital audio workstation (DAW) software application 101 is installed on and is executable from computer 100. DAW 101 is adapted as a digital studio for receiving digital audio, and/or video (if enabled) sourced from an audio, or audio/video source system or device, and for providing feed management and audio processing capabilities as are generally known in the art of digital studio editing applications. In prior art implementations, DAW 101 would be directly connected to a system soundcard device like a device illustrated in this example as a system soundcard device 107.

In a preferred embodiment of the present invention, a virtual monitor software solution (VMS) 102 is provided as an installable software application to computer 100. VMS application 102 is executable from computer 100 and is integrated with DAW 101 to provide an intermediary software capability as an interface between DAW 101 and a soundcard device, illustrated herein as system soundcard device 107. VMS application 102 is intended to replace dedicated hardware monitoring and/or control room devices and/or the control room and monitor section of a hardware mixer and the like, some of which are referenced in the background section of this specification. However, VMS 102 may also be used in conjunction with dedicated hardware mixing and control room surface boards or the like without departing from the spirit and scope of the present invention. In such embodiments, the VMS supports a virtual crosspoint matrix, which does not then have to be physically provided on any piece of hardware.

VMS 102 presents a bank of or a plurality of virtual input and output ports, also termed inputs and outputs, to DAW 101, which presents like virtual input and output ports 110e and 110f respectively. These are illustrated in this example as outputs 110a and as inputs 110b for VMS 102. VMS 102 is scalable in size including the number of ports it supports. Therefore, the exact number of virtual input ports and virtual output ports may vary according to version and also by configuration capability enabled within the application without departing from the spirit and scope of the present invention. In this example and for discussion purposes only, outputs 110a and inputs 110b are described in terms of audio ports although they may also be capable of video input and output (if enabled) with respect to DAW 101. Audio input and output ports 110b and 110a, as well as inputs 110e and 110f on DAW 101, respectively may include, but may not be limited to such port types as Steinberg's audio input output technology (ASIO™), Microsoft's DirectX™ or Core Audio™ provided by Apple Computer, INC.

In this logical block diagram, outputs and inputs 110a and 110b respectively are configured to a crosspoint monitor matrix 103, which is the heart of the VMS application. Matrix 103 comprises a plurality of signal crosspoints (not illustrated here) that may be used to collectively route audio signals through specific routes to other systems and devices. Matrix 103 is constructed using software programming and crosspoints are logically represented herein in an arrangement of columns and rows. Matrix 103 provides a platform for audio signal routing and for signal manipulation for volume or gain. VMS 102 also includes other matrix configurations constructed of programming code. These are a recording matrix 104 and a control matrix 105. Record matrix 104 and control matrix 105 are logically illustrated as separated from monitor matrix 103 for discussion purpose only. In actual practice, these matrix functions may be seamlessly integrated within the monitor matrix domain and may be identified by crosspoint configurations. In one embodiment, they may be configured as sub-matrices.

Record matrix 104 functions to provide selective signal isolation, grouping, and routing to a recording system either internal, represented by software, or to an external to computer 100, represented by software on another connected computer or by a dedicated hardware device. Volume control and other digital sound editing capabilities and digital signal processing (DSP) functions are available for application to routed signals according to output system or end system requirements or preferences. Although not physically illustrated, individual ones or a plurality of outputs 110a and inputs 110b may also support recording matrix 104 and control matrix 105 without departing from the spirit and scope of the present invention.

VMS 102 supports a variety of audio processing plug-in modules typically available to or provided in digital sound applications like Core Audio™, Direct X™, ASIO™, Virtual Studio Technology (VST™), Audio Units (AU™) and others. A processing block 106 is provided and is represented logically herein as a support-block for those various modules. Those plug-in modules may be provided in various versions and in various component mixes without departing from the spirit and scope of the present invention. In this way, VMS 102 may be pre-programmed to work successfully with a wide variety of proprietary and newly developing audio formats and file types including the codecs used on those file types for compressing and de-compressing and for quality formatting, end device, and sound configuration.

VMS 102 supports a bank of virtual input/output (I/O) ports 110c that are connected to virtual I/O ports 110d of system soundcard device 107 in this example. Like virtual input and output ports 110b and 110a, virtual I/O ports 110c and 110d respectively may include, but may not be limited to such port types as Steinberg's audio input output technology (ASIO™), Microsoft's WDM™ or Core Audio™ provided by Apple Computer, INC. VMS 102 presents itself as a sound hardware interface to DAW 101 and as an audio software application to system soundcard device 107 in this configuration. VMS provides a completely digital software solution for audio signal processing and routing to and from internal and external processing blocks or systems.

In practice of the invention, output busses (represented by arrow) from DAW 101 may output from one or more virtual outputs 110f and may connect to inputs 110b and output signals from VMS 102 may be connected to input busses (represented by arrow) and virtual inputs 110e of DAW 101. Signals received within matrix 103 may be separated, accumulated and manipulated in terms of sound and further digital processing before eventual output to soundcard device 107 and over a selected speaker system set up for monitoring for control, recording, or simply listening. VMS 102 supports surround sound speaker configurations including 5.1, 6.1, and 7.1 in some embodiments.

In a preferred embodiment, VMS 102 enables a user to connect his or her speaker configuration to soundcard device 107 of computer 100 and to then have control over volume, signal routing, and various other parameters through software control, and in some cases additionally through peripheral or external hardware control interfaces adapted for the purpose and connected to the system. For example, computer 100 may be one of more than one computing platform set up and configured for a local area network or Ethernet network. In this case, an external device may be another computer node running a version of VMS 102 and DAW 101. In a variation, a LAN-connected node may be a dedicated system for recording sound or mixing sound and video. In still another embodiment, external devices may be available that may provide source audio or effects or process received audio in cooperation with computer 100 through USB connectivity or some other digital communication protocol such as serial bus communication or wireless networking. There are many possible component inclusions, exclusions, and overall system composites that are achievable without departing from the spirit and scope of the present invention. The only requirement is that the soundcard device supports multiple audio ports, many types of which are known to and are available to the inventor.

Although not specifically illustrated in this example, VMS 102 may further include a graphic user interface for configuring virtual input and virtual output ports and connecting those ports to live audio inputs and outputs of a digital audio station. Also, a control interface may be provided including virtual "computer screen" control indicia including volume sliders and ramp controls, signal routing selection controls, dim controls fade controls, trimming stations, voice channel management controls and other standard provisions typically provided as hardware indicia on a hardware mixing board with signal routing capability and patch-through capability to other hardware systems or devices. Provision of VMS 102 between DAW 101 and soundcard device 107 may completely alleviate a need for dedicated hardware monitoring and mixing devices or systems according to one preferred embodiment.

Figure 2:
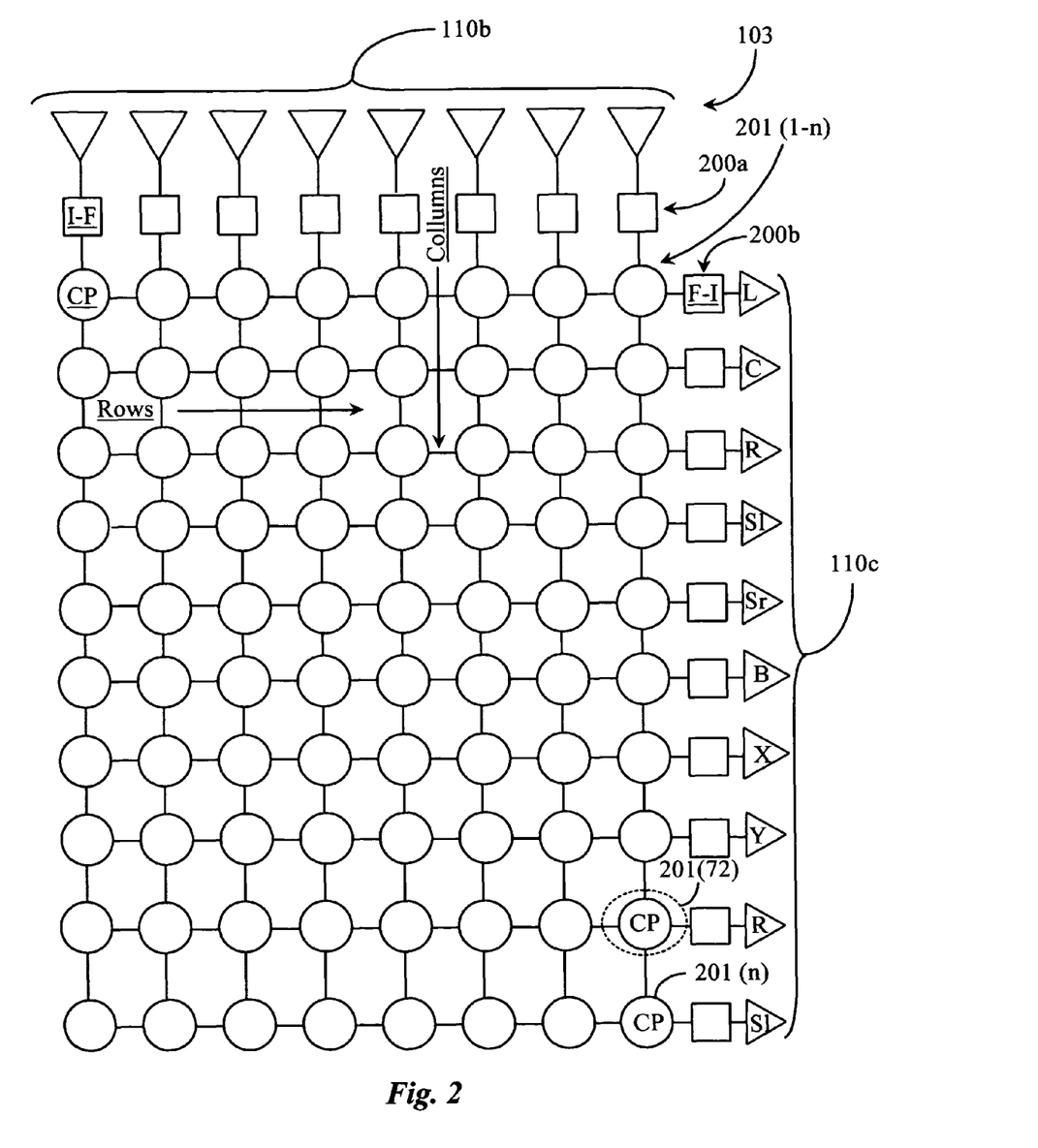
FIG. 2 is a block diagram illustrating components of the monitor matrix of FIG. 1 according to an embodiment of the present invention.

FIG. 2 is a block diagram illustrating components of the monitor matrix 103 of FIG. 1 according to one embodiment of the present invention. Monitor matrix 103 is logically illustrated in this example as a plurality of digital crosspoints (CPs) 201 (1-n) arranged logically through software programming into a matrix of intersecting horizontal rows (illustrated by arrow) and vertical columns (illustrated by arrow). In actual practice the crosspoints are realized in software code and are constrained mathematically to function as a matrix. The exact number of crosspoints 201 (1-n) may vary according to the number of configured input audio ports and the number of configured output audio ports supported by a particular version of VMS software. A first crosspoint 201 (1) and a last crosspoint 201(n) are illustrated in this example as well as a crosspoint 201 (72), which is illustrated in greater detail later in this specification to show crosspoint logical architecture and function. Each input port 110b accepts some input signal from a source such as a DAW analogous to DAW 101 of FIG. 1. In this example, outputs back into a DAW are not illustrated to save space and to clarify description, although there may be one or more signals fed back into a DAW or to any other external device or another crosspoint matrix without departing from the spirit and scope of the present invention. It is noted herein that recording and control matrixes may be assumed present within the matrix referred to herein as matrix 103.

In this example, there are 8 input ports 110b realized in software and there are 10 output ports emanating from matrix 103 realized in software. It is noted herein however that there is no limit to the numbers of inputs and outputs that may be supported. Each audio input 110b includes an integer to floating point (I-F) conversion block logically illustrated herein as rectangular blocks 200a. For the purpose of digital processing and control, floating point representation of signals where decimals are allowed provides greater dynamic range with respect to digital signal processing (DSP). Both integer and floating point signal representation is known in the art and are therefore not greatly detailed. Matrix 103 may process and route signals in integer or floating point representation without departing from the spirit and scope of the present invention.

Individual ones of inputs 110b may represent one or more inputs for the same signal and additional inputs for additional audio signals. More about different types of input configurations will be provided later in this specification. Matrix 103 has 10 output ports 110c in this example. Ports 110c are analogous same as those represented with respect to FIG. 1, hence the same element number applies. Each output port includes a floating point to integer (F-I) conversion block logically illustrated herein as rectangular blocks 200b. F-I blocks 200b convert the signal value representations back to integer format from floating point representation.

The purpose of matrix 103 is to provide signal routing and signal manipulation capabilities to a user operating the VMS software of the present invention. Output ports 110c are virtual or realized in software. They are connected to virtual input ports of a sound card device driver as previously described above. As signals travel down each column from crosspoint to crosspoint, the signal strength value in decibels (dB) may remain constant. As each signal progresses logically from left to right in each horizontal row to outputs of matrix 103, the signal strength may be amplified (gain) or reduced at each crosspoint by applying a multiplication factor. Each input signal may also be routed to a desired output port 110c by tapping into the signal from the input column and drawing the signal across any row to output.

Although matrix 103 is illustrated as a unidirectional matrix in this example, in actual practice it is bi-directional in that signals may be input back into the matrix or looped through the matrix after external treatment. This very simple example illustrates how input signals are routed to outputs 110c for monitoring and control. In this particular configuration example of a surround sound 5.1 speaker-setup, 10 outputs 110c are labeled from top to bottom. The first output port 110c (row 1) is labeled L for left speaker. The next output port 110c below L is labeled C for center speaker. Subsequent ports 110c in descending order are labeled R (right speaker); Sl (surround left); Sr (surround right); and B (boom speaker). These first 6 outputs may be configured as a surround bus, in this case (5.1) and routed to a main control room for monitoring sound and imputing further processing control to any of the signal output streams. In this example inputs 110b 7 and 8 are simultaneously routed to outputs 110c 7 and 8 and are configured as a stereo bus with volume control. All 8 inputs 110c may also be routed simultaneously to the last 2 outputs 9, and 10 for additional control room output (Alt 1) and may be provided, as well, with a volume control. In this case, all 10 outputs go to a control room as main outputs 1-8 and alternate outputs 9 and 10.

Because each signal input can be routed across the matrix as desired, there is no limit to the variance of architectures that may be provided in any real world example for monitoring, mixing, signal processing, and recording. The system may be configured for stereo, mono, and surround sound 5.1, 6. 1, or 7.1. For example 7.1 surround sound might use the first 8 outputs with only 9 and 10 configured as additional outputs. Likewise for robust sound monitoring and processing system requirements, matrix 103 may be provided with any greater number of inputs and outputs. Outputs may be grouped into busses for input to virtual soundcard ports.

Inputs 110b may be defined as stereo or mono signal busses, recorder returns, external inputs, production inputs, talkback and listen channels, and recorder input. Inserted processes for digital signal manipulation may be achieved using insert sends and insert returns to route any signal to an external system adapted to perform one or more processes on the signal either before inputting the signal into the matrix or after the signal has left the matrix.

Matrix 103 may be adapted not only to rout the input signals as desired to specific output ports, volume control may be added for any input signal or signal group. Inputting a gain factor to one or more crosspoints where the factor functions to amplify or to reduce the signal accordingly controls volume. A separate volume control may be provided for this function in the form of one or more virtual control indices such as a volume button, knob, or ramp function that would represent such controls on a hardware mixing console that the present invention may replace by provision of a graphic user interface representing the console control interface.

In practice using this particular example, all 8 inputs 110b may be routed output signals from a sound application like DAW 101 of FIG. 1. The first 6 inputs 110b (taken from left to right) may be routed to the first 6 outputs 110c (taken from top to bottom). A volume control may be added for ramping up or down the volume of those signals. Signals 7 and 8 may be routed as extra stereo outputs from a sound application like a DAW. All 8 signals may be simultaneously routed to outputs 9 and 10 for alternate control room monitoring. All 10 output ports may be connected to the virtual inputs of a sound card. More detail regarding crosspoint construction is provided below.

Figure 3:
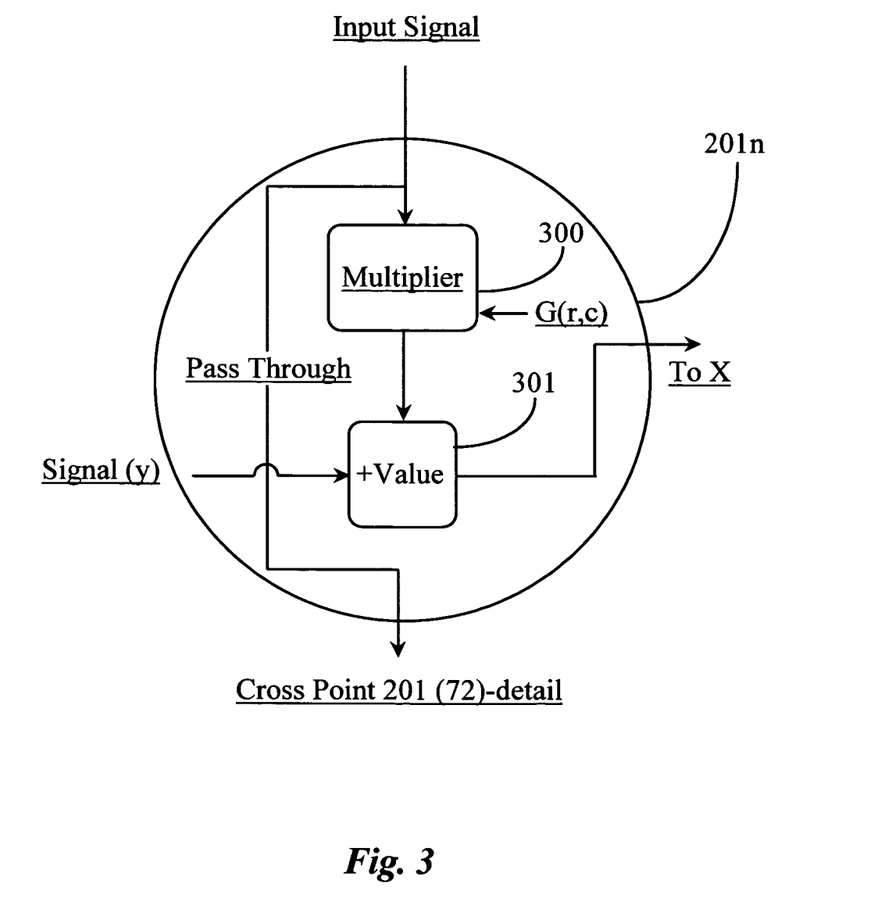
FIG. 3 is a block diagram illustrating detail of crosspoint 201 (72) of FIG. 2.

FIG. 3 is a block diagram logically illustrating detail of crosspoint 201 (72) of FIG. 2. Crosspoint 201 (72) is identical in implementation to all of the other crosspoints in a matrix. Each crosspoint has a gain variable input option for controlling signal gain horizontally across any row or at individual crosspoints. The signal gain may be pre-programmed or dynamically controlled and can be established from an external interface in real time as a feed or series of signals pass through the matrix. As a signal (y) passes horizontally toward output, the signal accumulates as illustrated herein by a + value block 301. The signal value coming down the column is a pass-through signal meaning that its value is the same as its input value and does not change through crosspoints down a column. Multiplier 300 acts on signal y passing through block 301 either providing amplification or reduction of the signal strength. Therefore, cross-points 201 1-$n$ are simple variable digital gain circuits represented in software in the form of a crosspoint matrix that controls signal routing and signal strength.

It is noted herein that each crosspoint requires an algorithmic "de-zippering" in order to smooth out the step structure of signal gain over x number of samples. Algorithmic function is used to smooth out the signal. Crosspoint gain variable may be set to default values for certain configurations in one embodiment. Any signal may be controlled in real time overriding any specific or targeted default values already set for the matrix.

Figure 4:
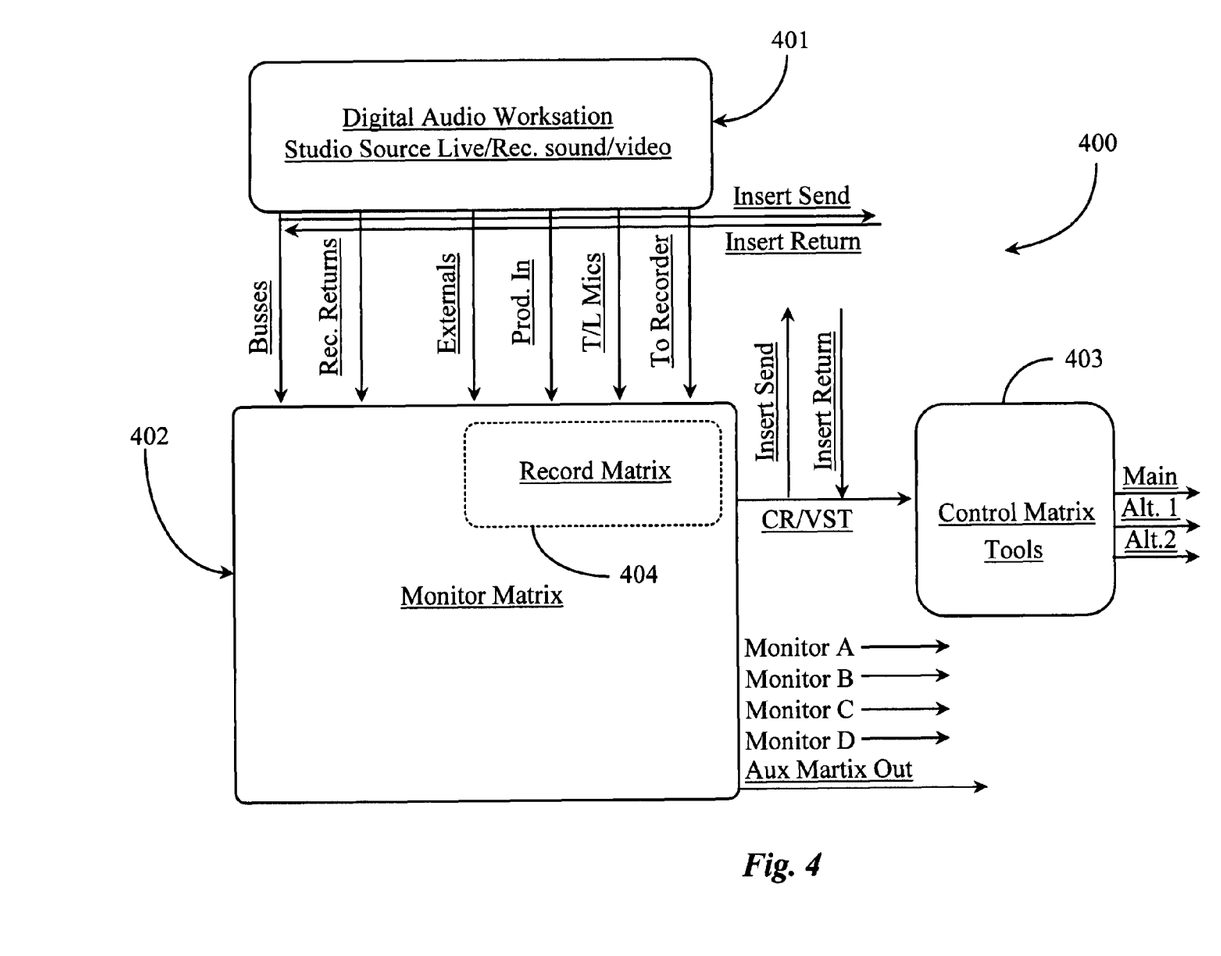
FIG. 4 is a block diagram illustrating a virtual monitor software application integrated with a digital audio workstation according to an embodiment of the present invention.

FIG. 4 is a block diagram illustrating a virtual monitor software application 400 integrated with a digital audio workstation 401 according to an embodiment of the present invention. VMS 400 includes a crosspoint monitor matrix 402 analogous to matrix 103 described with reference to FIG. 1. In this example, monitor matrix 402 contains a recording matrix integrated therein. DAW 401 may be analogous to DAW 101 of FIG. 1. DAW 401 may be an intermediary application to any studio source live or recorded sound and/or video.

In this example, inputs include (reading from left to right) busses, recording returns, externals, production in, talkback and listen microphone channels, and recording input. Recording input may typically be routed through the recording matrix portion of monitor matrix 402. Busses may include stereo and mono busses. Recording returns may include stem-recording returns. Stems include any partial component or "branch" of an overall sound/video project that is being mixed or produced. Stems are inherently easier to work with be fore final mixing. Externals may include DVD or CD feeds, deck players, or other external sound sources. Production in may include any film or movie recorded sound, live feeds, and so on. Talkback and listen channels enable producers to communicate bi-directionally with those in the studio such as musicians, technicians, and others. Recorder feeds may include any signals that are routed through the recording matrix to a recorder system. It is noted herein as well that any process may be performed on any of the signals by creating an insert in the feed whereupon a signal or signal group is diverted or sent to a system component for some particular process to be performed, typically called an insert send. An insert return is the signal or signals returning to the path after processing or an insert return. Such processing may be performed before entering matrix 402 or after leaving matrix 402 as illustrated by offshoot send and return inert arrows.

Output from matrix 402 is strategically routed according to specific output requirements. In this example, an output to a control matrix 403 is provided as a control room option for performing additional digital signal processing using known plug-ins that were mentioned further above in this specification. In this case, insert send and return arrows indicate processing the signal or signals output with plug-ins like VST, Core Audio, Direct X, or other processing modules realized in software or external hardware. Output from control room matrix 403 is fed to a main control room and there are 2 additional control room feeds alternate (Alt.) 1 and Alt. 2.

Tools available in the control room for use on a signal or signals routed through control matrix 403 may include dynamic speaker selection, signal level control with dim and cut options, LF management options, speaker trim options, pink noise management, metering, and signal delay adjustment. Moreover, other known signal processing tasks may be performed though they may not be specifically illustrated in this example. In this example, output from matrix 402 is also routed to specific monitors set up and adapted for monitoring sound although some may be for video as well. These are monitors A-D, which may be set up in a studio hosting live musicians and may include floor monitors or headset monitors. In addition there is a feed out to an auxiliary (Aux.) matrix.

In one embodiment, all of the components, monitor matrix 402, record matrix 404, and control matrix 403 are realized in software. All of the inputs and outputs of the software are configurable according to specifications and supported output and input device or system types. In one embodiment there are more than one node connected to a network where each node has a VMS application including a monitor matrix, recording matrix, and control matrix. In this case, output feeds may be routed over the network into additional nodes and matrices. Also in this embodiment, more than one soundcard device may be connected to the system and may peripheral source devices and end devices may be connected to one or more of the networked nodes. In this way sound and video production may occur without any hardware mixing-type consoles. All of the required function for routing signals, controlling their levels, and performing editing tasks may be accomplished entirely in software. There may be dedicated nodes comprising source devices generating signals and end devices or intermediary devices for receiving signals and performing some task or process on those received signals without departing from the spirit and scope of the present invention. Likewise, many if not all of those standard processes may also be performed on the computer using the software of the present invention.

Figure 5:
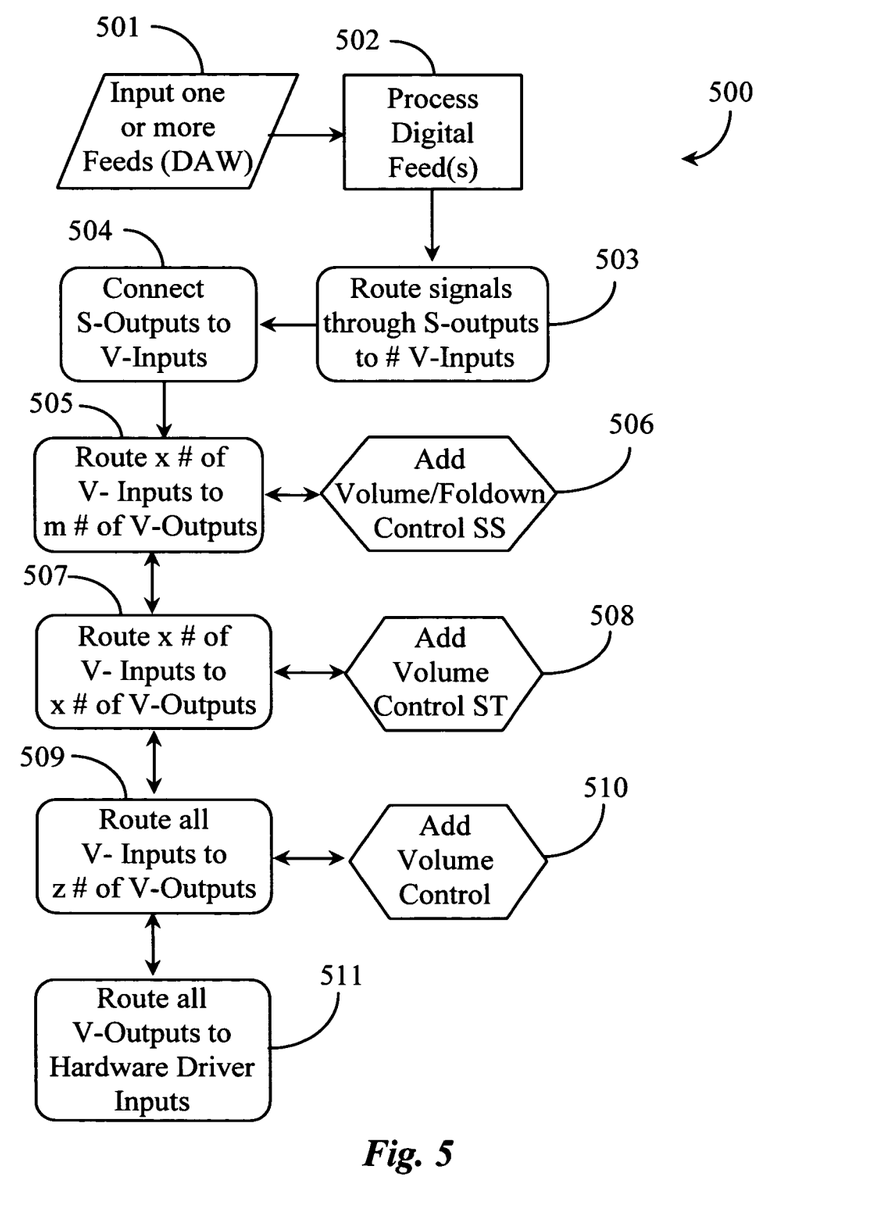
FIG. 5 is a process flow chart illustrating steps for routing and controlling one or more digital feed input into the virtual monitor software from a digital workstation.

FIG. 5 is a process flow chart 500 illustrating steps for routing and controlling one or more digital feed input into the virtual monitor software from a digital workstation. At step 501, one or more audio or audio/video signal is input into a digital audio or audio/video editing software application analogous to a DAW or other type of software running on a computing platform. At step 502, certain audio and or audio video processing is performed using that DAW or other editing software.

At step 503, the feed signal or signals are routed through one or more software outputs of the application to a number of virtual input ports on a VMS analogous to VMS 102 described with reference to FIG. 1. At step 504 the software outputs are connected to the virtual inputs. In this step, the VMS presents as a hardware interface to the software application. All standard port configurations may be supported as well as newly developed formats.

At step 505, an x number of V-input ports may be routed to an m number of V-output ports through a crosspoint matrix (monitor matrix) entirely realized in software. The exact number of V-inputs routed to V-outputs through the matrix will depend entirely on application and configuration preferences. Each input is configured for the desired output system that will eventually receive the signals. At step 506, folddown and volume control are added for the routed signals. Foldown is known in the art used to fold the channels of a surround sound signal such as 5.1 surround, for example, into a stereo output. At step 507, an x number of V-inputs are routed to an x-number of V-outputs of the matrix. At step 508, a volume control is added for those routed signals. It is important to note herein that some of the matrix may be a recording matrix and a control matrix.

At step 509, all of the V-inputs are routed to a z number of V-outputs. In practice, there may be more outputs than inputs and inputs may be assigned to outputs according to preference. Likewise, each assignment of inputs to outputs may follow a variety of audio configuration formats like surround bus, mono, stereo, and so on. At step 510, a volume control is added to the inputs and is reflected in the z number of output signals emanating from the matrix. All of the V-outputs are subsequently routed to hardware drive (soundcard) virtual inputs at step 511. It is noted herein that the many outputs may be grouped into busses configured for surround and other protocols before connecting those to the soundcard for audio.

Figure 6:
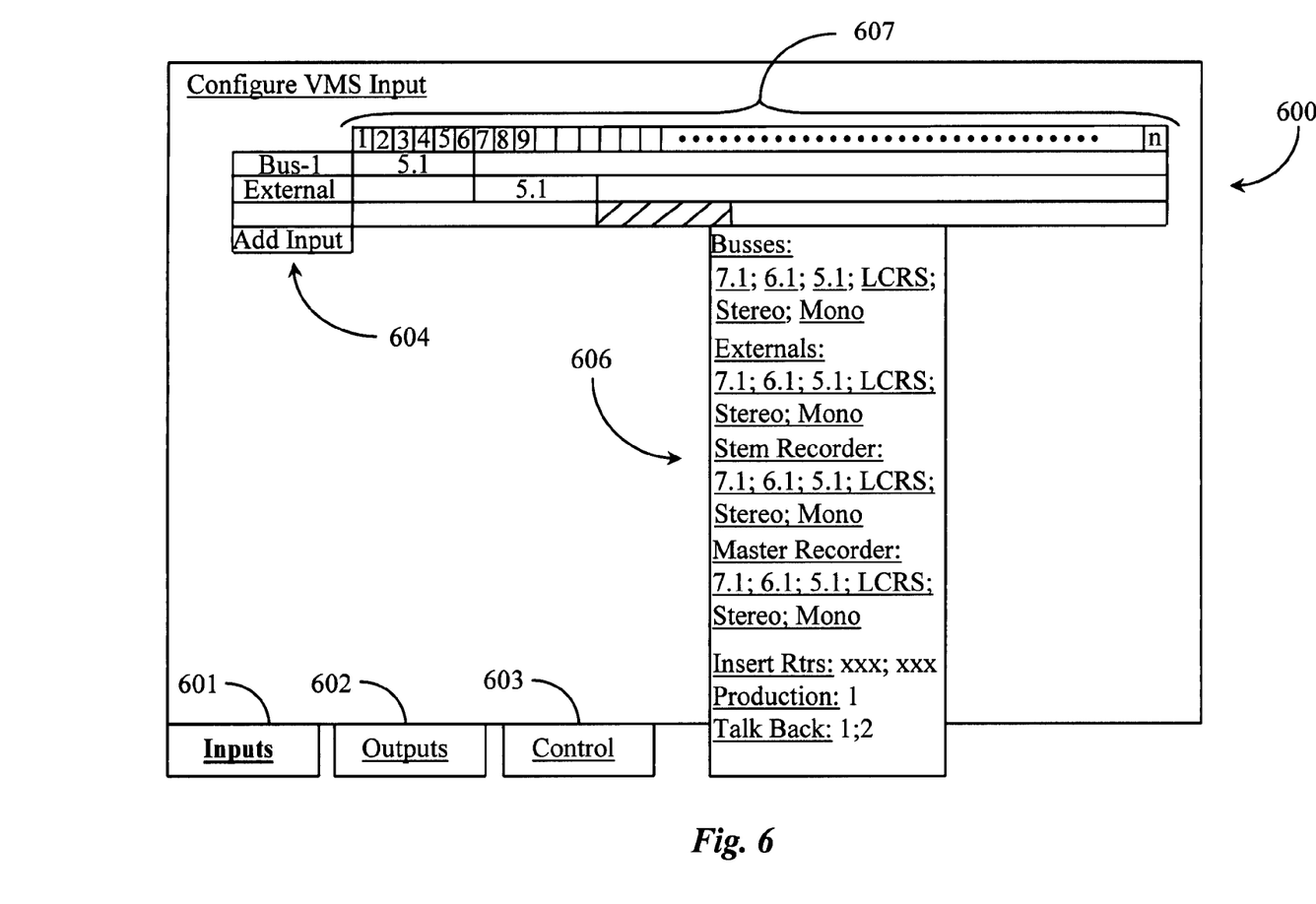
FIG. 6 is a plan view of a user interface screen for configuring input ports according to an embodiment of the present invention.

FIG. 6 is a plan view of a user interface screen 600 for configuring inputs according to an embodiment of the present invention. Screen 600 may be part of a graphic user interface (GUI) provided with the VMS solution of the present invention. Screen 600 is an interface for configuring virtual inputs of the matrix in this example. An interactive tab 601 labeled Inputs is selected to bring up the screen for use. An interactive tab 602 labeled outputs causes a screen to display for configuring output ports, and an interactive tab 603 labeled controls causes a screen to display for configuring and implementing control room functions.

Screen 600 displays a list of possible virtual inputs for configuration numbered 607 (1-*n*). The exact number of virtual inputs supported is not specifically limited except by software versioning. In this case, a user interactive panel 604 is provided for adding an input type from a dropdown menu 606 listing types of inputs and options for configuring those inputs.

In this particular example, a Bus-1 is selected from dropdown list 606 and configured for surround sound 5.1. This buss takes V-inputs 1-6. A second selection of External has also been configured for 5.1 surround sound and takes up the next 6 inputs 7-12. A third selection has not yet been made but a cross-hatched block indicates that there will be a reservation and current dropdown list 606 offers the choices for filling that slot. Using screen 600, a user may select which types of input ports to use and may also configure those ports accordingly. For example, input busses may be configured for 7.1, 6.1, and 5.1, LCRS, Stereo, or Mono. External input, Stem recorder inputs, and master recorder inputs are available options for assigning inputs and configuring them for sound. Insert returns, one or a group of signals incoming from an audio effects or compression device may be assigned as well as any production in and talkback and listen channels. In this case there is one production in channel and 2 talkback and listen channels configured.

One with skill in the art of sound editing will appreciate that there may be more types of inputs configured than are illustrated in this example without departing from the spirit and scope of the present invention. The inventor chooses to list more important functions here and deems the illustration sufficient for purposes of explanation of different options presented.

Figure 7:
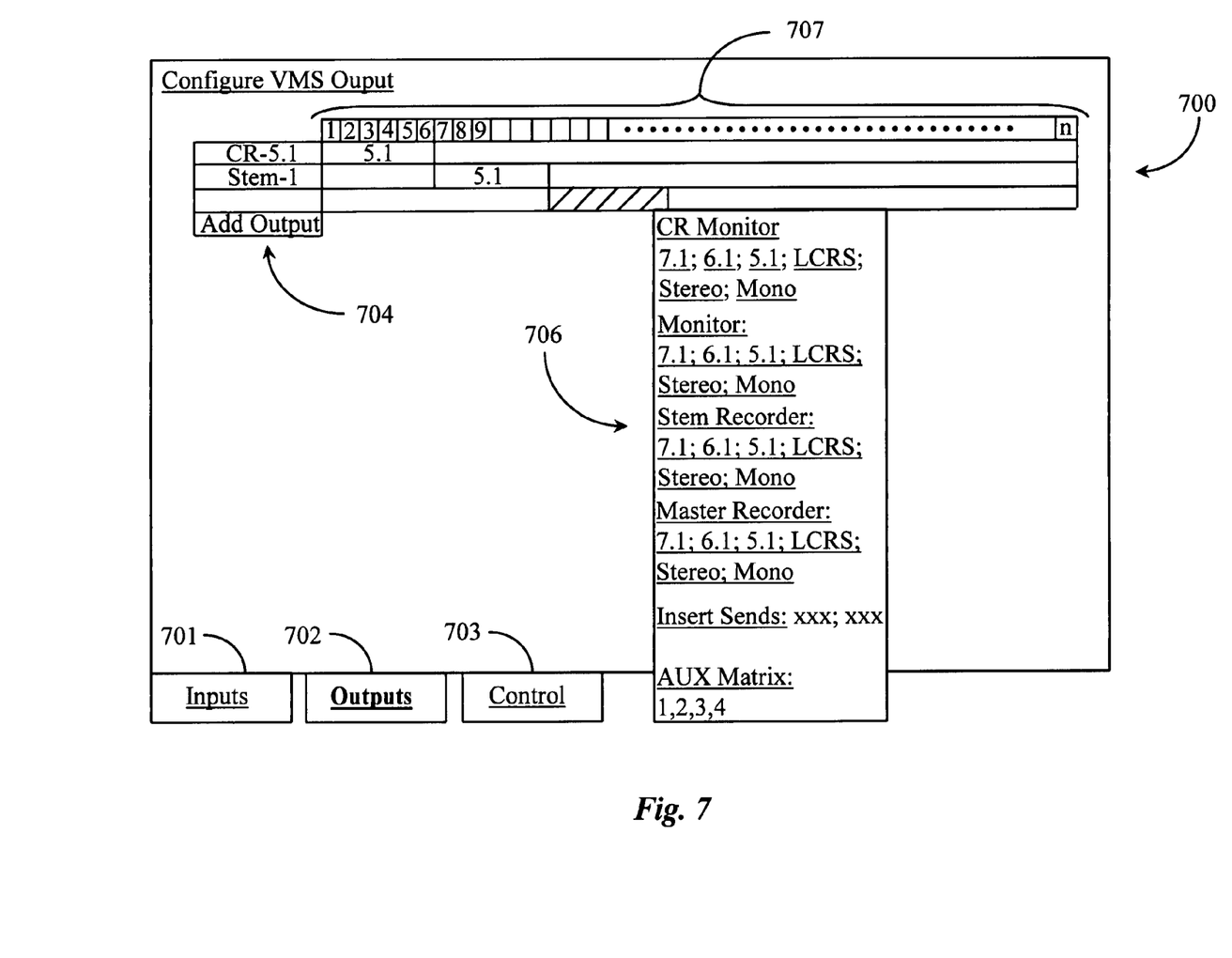
FIG. 7 is a plan view of a user interface screen for configuring output ports according to an embodiment of the present invention.

FIG. 7 is a plan view of a user interface screen 700 for configuring virtual outputs according to an embodiment of the present invention. Screen 700 is caused to display when a user selects the outputs tab on the master interface. In this example Input tab 701; Output tab 702 and Control tab 703 are illustrated. These interactive tabs are analogous to those described with reference to screen 600 above and are available for selection from any screen of the overall interface. Like screen 600, screen 700 displays a list of outputs 707 (1-*n*). Outputs may be assigned by type as well as inputs. Using the same interactive selection and configuration process as was described above for screen 600, a user has selected an output port for output to control room and has configured the port for 5.1 surround encompassing the first 6 inputs. It is important to note herein that the 5.1 buss configured in screen 600 will be the output to a control room configured for 5.1 surround. Therefore, separate signal components will follow the speaker setup for 5.1 surround and have separate volume control.

Interactive panel 704 provides the utility for adding new output types and dropdown menu 706 enable port selection and configuration of the port for sound. Screen 600 Bus-1 may be routed to screen 700 CR-5.1 output for control room monitoring. A second output type Stem-1 has been selected and configured for 5.1 surround sound. The stem may be an output to a recording device for the external input configured with respect to screen 600. Again, a crosshatched block illustrates a next slot to fill. Options in dropdown menu 706 include, but are not limited to CR Monitor, Monitor, Stem Recorder, Master Recorder, Insert Sends, and AUX (Auxiliary) Matrix. In this example there are 2 choices for insert sends and 4 choices for additional matrices.

Once all of the matrix outputs are configured, they may be connected to a soundcard device or system. Technically speaking, the system of the invention provides much more flexibility than does current dedicated hardware-systems by enabling complete control over which inputs and outputs will be established for routing purposes. All of the outputs are also supported for volume control. Therefore, a user may route a 5.1 surround bus to CR-main where each bus signal goes to a different speaker and is separately controllable for volume level as well as variable gain.

Using screen 700, a user may determine where each signal is output and at what level the signal is output. Likewise, the user may determine any internal or external processing using inserts. There are many possibilities.

Figure 8:
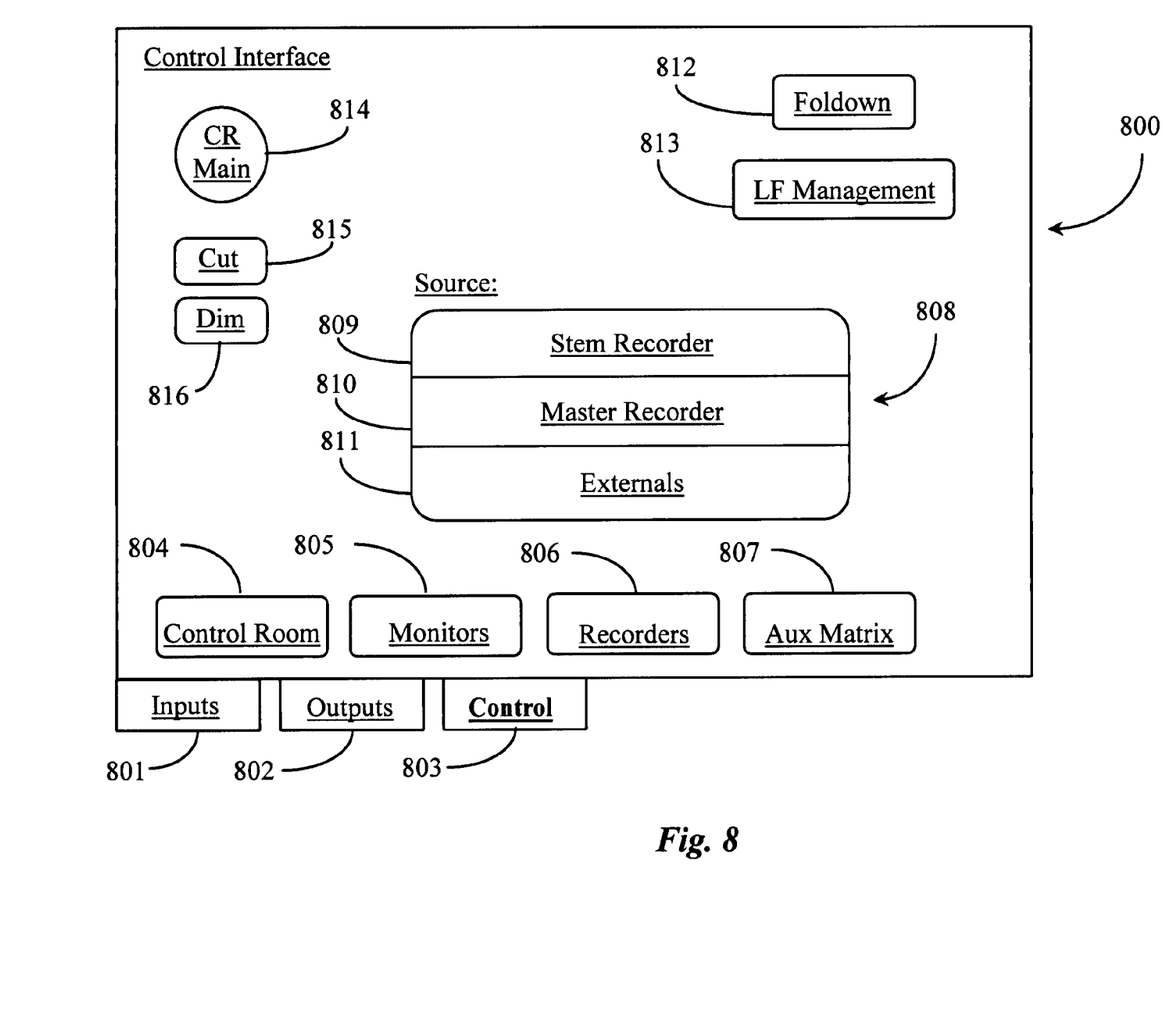
FIG. 8 is a plan view of a user interface screen for setting controls and for accessing external systems according to an embodiment of the present invention.

FIG. 8 is a plan view of a user interface screen 800 for setting controls and for accessing external systems according to an embodiment of the present invention. Screen 800 is displayed as the result of a user interacting with a control tab 803, which is analogous to tabs 703 and 603 described previously. From screen 800, a user has access to control room volume via an interactive knob icon 814 labeled CR-Main. Screen 800 enables access to controls such as a cut control function 815 and a dim function 816. Additional control room functions accessible through screen 800 include a channel foldown feature 812 and an LF management feature 813.

From screen 800, all of the active feeds are accessible for processing and treatment including source feeds listed herein as a feed-in from a stem recorder 809, a feed-in from a master recorder 810, and a feed-in from an external source 811. Moreover, all of the output feeds are also accessible including, in this example, a feed to control room 804, a feeds to monitors 805, feeds to recorders 806, and any feed to another matrix 807. In this simple example, only a few editing functions are illustrated. However one with skill in the art will appreciate the many digital editing processes that are possible without departing from the spirit and scope of the present invention.

What is claimed is:

1. A system for providing a software-based interface with a digital sound editing application, the system comprising:
   a computer-readable storage medium embodying program code, wherein execution of the program code by a processor implements a crosspoint matrix for digital signal routing, wherein the crosspoint matrix is logically inserted between the digital sound editing application and a sound output device, the crosspoint matrix including:
   a plurality of configurable inputs adapted to accept one or more input signals from the digital sound editing application running on a host computer;
   a plurality of configurable outputs connected via signal paths to one or more of the configurable inputs and configured to route signals to audio monitoring equipment;
   a plurality of signal path intersections, each signal path intersection corresponding to a single associated input-output pair; and
   a variable gain controller at each signal path intersection; and
   a graphic user interface allowing for user control of a signal level by adjusting one or more of the variable gain controllers through one or more virtual controls displayed on the graphic user interface.

2. A system for providing a software-based interface with a sound output device, the system comprising:
   a computer-readable storage medium embodying program code, wherein execution of the program code by a processor implements a crosspoint matrix logically inserted between a plurality of digital signal inputs and the sound output device for digital signal routing and control of the sound output device, wherein the sound output device outputs audio to audio monitoring equipment, the crosspoint matrix including:
   a plurality of configurable inputs adapted to accept one or more input signals,
   a plurality of configurable outputs connected via signal paths to one or more of the configurable inputs, and wherein one or more of the outputs further connect to virtual inputs ports on the sound output device,
   a plurality of signal path intersections, each signal path intersection corresponding to a single associated input-output pair, and
   a variable gain controller at each signal path intersection; and
   a graphic user interface allowing for user control of a signal level by adjusting one or more of the variable gain controllers through one or more virtual controls displayed on the graphic user interface.

3. A non-transitory computer-readable storage medium having embodied thereon a program, the program being executable by a processor to:
   route and process digital signal output from an audio editing application via a virtual sound hardware interface, the virtual sound hardware interface including a crosspoint matrix, the crosspoint matrix having a plurality of audio signal inputs, a plurality of audio signal outputs capable of routing signals to audio monitoring equipment via a sound output device and a plurality of audio signal path intersections, each audio signal path intersection corresponding to a single associated input output pair and having an associated variable gain controller integrated within the crosspoint matrix; and generate a graphical user interface to allow a user to:
configure audio signal inputs and outputs of the crosspoint matrix, and
adjust an audio signal strength level by adjusting one or more of the variable gain controllers through one or more virtual controls displayed on the graphic user interface.

4. The computer-readable storage medium of claim 3, wherein the program is installed and executed on a computer system hosting the audio editing application and the sound and the virtual sound hardware interface.

5. The computer-readable storage medium of claim 4, further comprising receiving audio input from other nodes on a local area network.

6. The computer-readable storage medium of claim 4, further comprising:
routing audio signals to other nodes on a local area network, the other nodes providing digital signal processing of the routed audio signals; and
receiving processed audio signals from the other nodes, the processed audio signals received as new inputs.

7. A system for digital signal routing and control, the system comprising:
a crosspoint matrix embodied in a computer-readable storage medium and executable by a processor to implement a plurality of audio signal path intersections, each signal path intersection corresponding to a single audio signal input-output pair and having an associated variable gain controller integrated within the crosspoint matrix, the crosspoint matrix logically inserted between a digital audio editing application and a sound output device;
audio monitoring equipment connected to the sound output device; and
a user interface for configuring inputs and outputs of the crosspoint matrix and for implementing control functions to the signals traveling the matrix, the user interface including one or more controls allowing for a change in audio signal strength level by adjusting one or more of the variable gain controllers.

8. The system of claim 7, wherein the user interface is a graphical user embodied in a computer-readable storage medium hosted in a same node or in a node connected to the node hosting the crosspoint matrix, the graphical user interface including one or more virtual controls for the variable gain controllers.

9. The system of claim 7, wherein the user interface is a hardware control surface having network or peripheral access to the node hosting the crosspoint matrix.

10. A method for monitoring audio in an application logically inserted between an audio editing software application and a sound output device, the method comprising:
receiving inputs from the audio editing software application;
providing outputs to the sound output device;
providing a software-implemented crosspoint matrix having a plurality of audio signal path intersections, each signal path intersection corresponding to a single audio signal input-output pair and having an associated variable gain controller integrated within the crosspoint matrix;
receiving one or more user generated audio monitoring feeds for output to the sound output device by selectively coupling one or more audio signal inputs to one or more audio signal outputs; and
selectively adjusting one or more of the variable gain controllers in response to user generated input individually controlling audio signal levels for the one or more audio monitoring feeds.

11. The method of claim 10, further comprising receiving user generated input for configuring one or more audio inputs and one or more audio outputs for desired sound protocols.

12. The method of claim 11 wherein the desired sound protocols are one or more of stereo, mono, 5.1 surround, 6.1 surround, 7.1 surround, or left center right surround (LCRS).

13. The method of claim 10 wherein the selective coupling is made through a graphical user interface using point-and-click selection.

14. The method of claim 10, wherein the inputs from the audio editing software application comprise at least one of a signal buss, an external feed-in, a recording stem feed-in, a master recording feed-in, an insert return, or a production feed-in.

15. The method of claim 11, wherein the desired audio output type comprises at least one of a control room monitor feed, a monitor feed, a stem recorder feed, a master recorder feed, an insert send, or an alternate feed to another matrix.

16. The system of claim 1, wherein the sound output device is a hardware sound card.

* * * * *